(12) United States Patent
Kang et al.

(10) Patent No.: US 11,320,905 B2
(45) Date of Patent: May 3, 2022

(54) APPARATUS AND METHOD FOR GENERATING IMAGE USING BRAIN WAVE

(71) Applicants: HYUNDAI MOTOR COMPANY, Seoul (KR); KIA MOTORS CORPORATION, Seoul (KR); SOOKMYUNG WOMEN'S UNIVERSITY INDUSTRY-ACADEMIC COOPERATION FOUNDATION, Seoul (KR)

(72) Inventors: Jeong Su Kang, Seongnam-si (KR); Suh Yeon Dong, Seoul (KR)

(73) Assignees: HYUNDAI MOTOR COMPANY, Seoul (KR); KIA MOTORS CORPORATION, Seoul (KR); SOOKMYUNG WOMEN'S UNI IND-ACAD COOPERATION FDN, Seoul (KR)

(*) Notice: Subject to any disclaimer, the term of this patent is extended or adjusted under 35 U.S.C. 154(b) by 111 days.

(21) Appl. No.: 17/038,875

(22) Filed: Sep. 30, 2020

(65) Prior Publication Data
US 2021/0124419 A1    Apr. 29, 2021

(30) Foreign Application Priority Data
Oct. 29, 2019 (KR) .................. 10-2019-0135835

(51) Int. Cl.
*G06F 3/01* (2006.01)
*B60W 40/08* (2012.01)
*G01C 21/36* (2006.01)
*G06N 3/04* (2006.01)

(52) U.S. Cl.
CPC ............. *G06F 3/015* (2013.01); *B60W 40/08* (2013.01); *G01C 21/3602* (2013.01); *G01C 21/3647* (2013.01); *G06N 3/0454* (2013.01); *B60W 2540/22* (2013.01)

(58) Field of Classification Search
None
See application file for complete search history.

(56) References Cited

U.S. PATENT DOCUMENTS

| 10,783,507 | B1* | 9/2020 | Votolato | G06Q 10/087 |
| 2004/0097824 | A1* | 5/2004 | Kageyama | B60R 16/0231 340/4.1 |
| 2010/0010365 | A1* | 1/2010 | Terao | A61B 5/369 600/544 |
| 2012/0049998 | A1* | 3/2012 | Lim | A61B 5/165 340/1.1 |

* cited by examiner

*Primary Examiner* — Christopher J Kohlman
(74) *Attorney, Agent, or Firm* — McDonnell Boehnen Hulbert & Berghoff LLP

(57) ABSTRACT

Disclosed herein are an apparatus and method for generating an image using a brain wave signal. The method of generating an image using brain wave signals includes collecting brain wave signals of at least one passenger in a mobility from a plurality of channels for a predetermined time, generating a first image of a service point from the brain wave signals collected from the plurality of channels using an artificial intelligence model, determining whether the generated first image is similar to a preset second image, and controlling the mobility based on a result of the determination.

20 Claims, 9 Drawing Sheets

−9.3μV    −0.6μV

−1.8μV    13.0μV

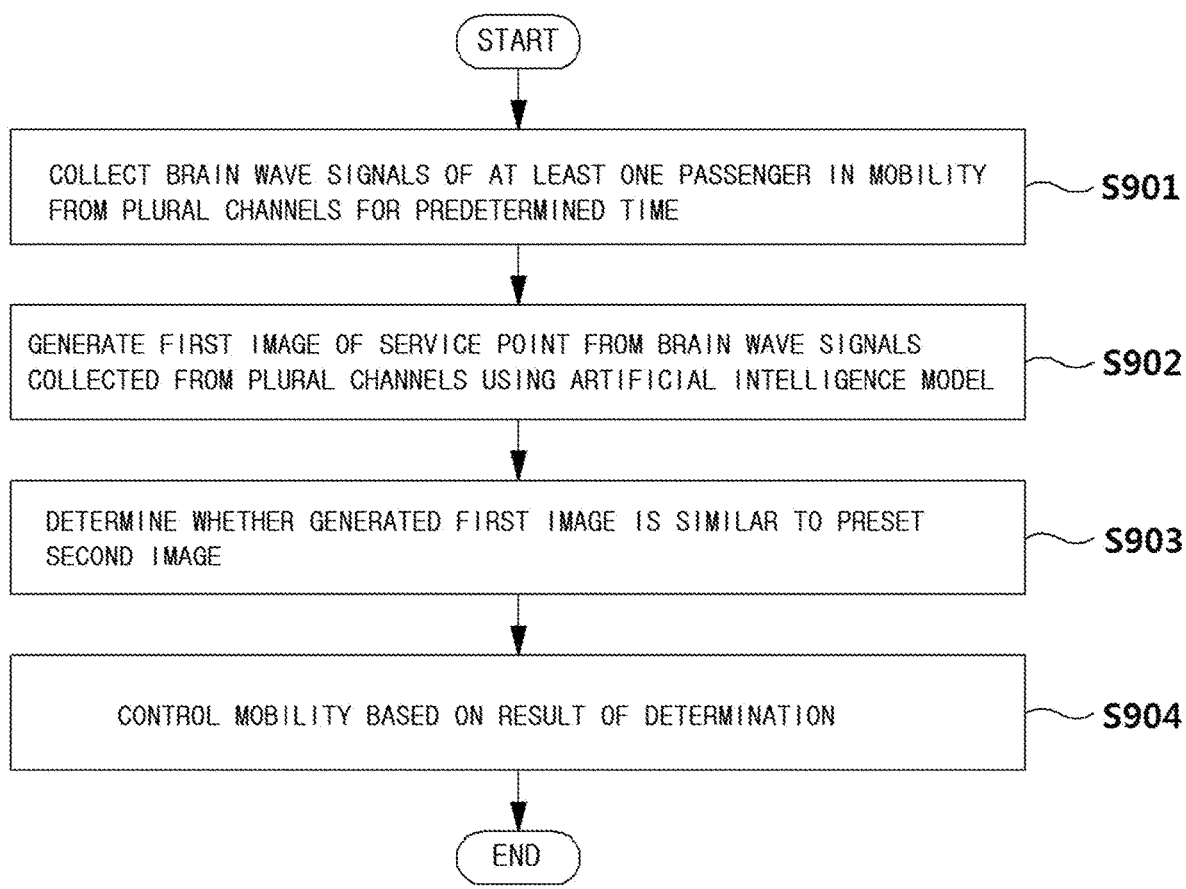

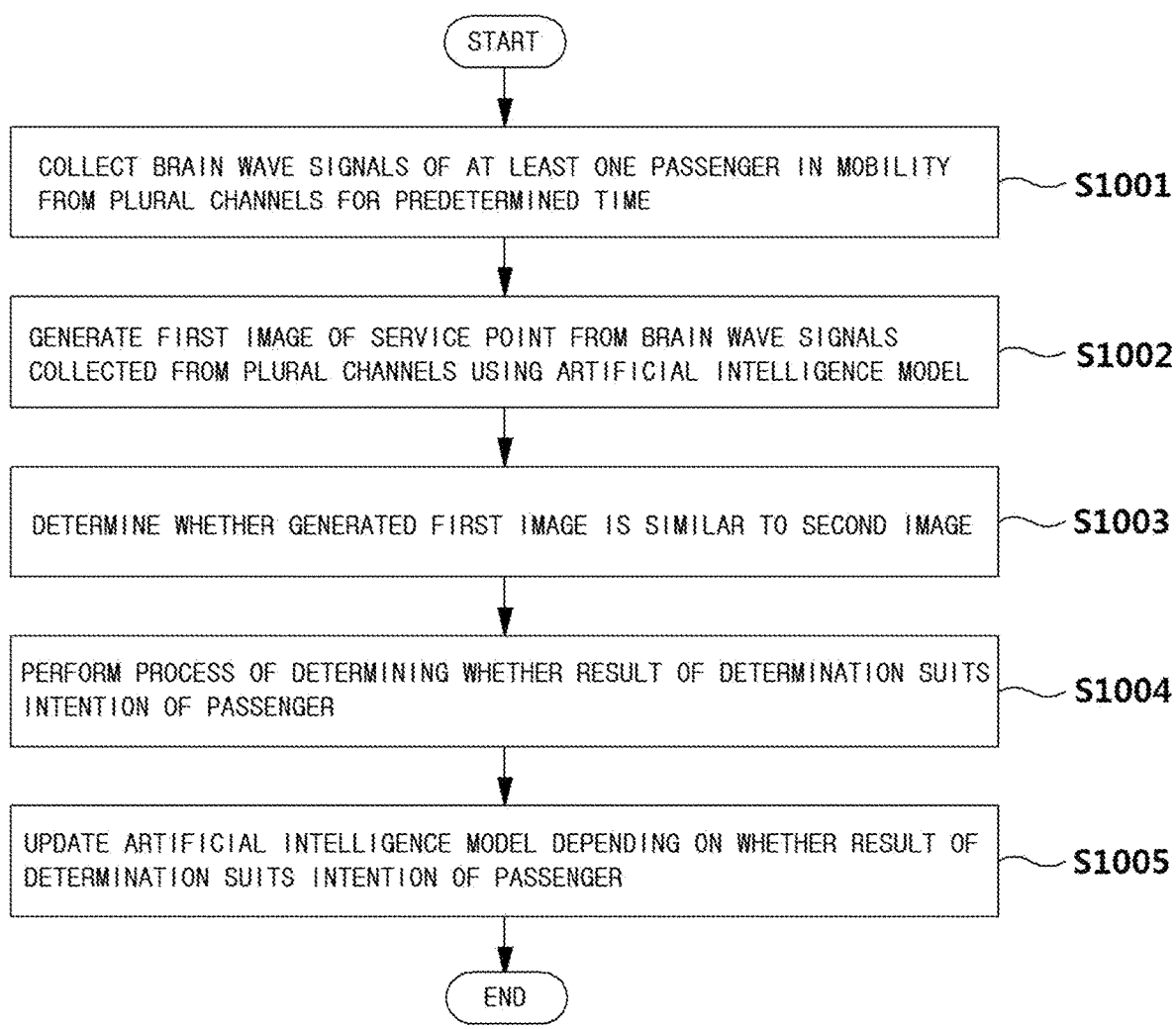

APPARATUS AND METHOD FOR GENERATING IMAGE USING BRAIN WAVE

CROSS REFERENCE TO RELATED APPLICATIONS

The present application claims priority to and the benefit of Korean Patent Application No. 10-2019-0135835, filed Oct. 29, 2019, which is incorporated herein by reference in its entirety.

TECHNICAL FIELD

The present disclosure relates to a mobility controlling method and apparatus. More particularly, the present disclosure relates to a mobility controlling method and apparatus based on error monitoring.

BACKGROUND

The statements in this section merely provide background information related to the present disclosure and may not constitute prior art.

As one of the transport means, a vehicle (or mobility) is a tool for living a life in the modern world. Furthermore, a vehicle itself may be regarded as something that gives meaning to someone.

As technology is advanced, functions provided by a vehicle also gradually evolve. For example, in recent years, vehicles not only transport a passenger to a destination, but also meet a passenger's needs for faster and safer travel to a destination. In addition, new devices are being added to vehicle systems in order to satisfy a passenger's aesthetic taste and comfort. In addition, the existing devices like steering wheels, transmissions and acceleration/deceleration devices are also being developed so that more functions can be provided to users.

Meanwhile, a brain-computer interface or a brain-machine interface is a field of controlling a computer or a machine according to a person's intention by using brain wave signals. ERP (Event-Related Potential) is closely related to cognitive functions.

In addition, recently, there is an increasing trend in research on recognizing and classifying objects included in an image using an artificial intelligence model and generating new images.

SUMMARY

An object of the present disclosure is to provide an apparatus and method for generating an image based on a brain wave signal of a passenger.

Another object of the present disclosure is to provide an apparatus and method for generating an image from a brain wave signal of a passenger using an artificial intelligence model and controlling a mobility based on the generated image.

The technical objects of the present disclosure are not limited to the above-mentioned technical objects, and other technical objects that are not mentioned will be clearly understood by those skilled in the art through the following descriptions.

According to the present disclosure, an apparatus for generating an image using brain wave signals includes a sensor configured to collect brain wave signals of at least one passenger in a mobility from a plurality of channels for a predetermined time, and a controller configured to generate a first image of a service point from the brain wave signals collected from the plurality of channels using an artificial intelligence model, to determine whether the generated first image is similar to a preset second image, and to control the mobility based on a result of determination.

The brain wave signals collected from the plurality of channels may be brain wave signals in at least one of a time domain, a frequency domain or a spatial domain.

The artificial intelligence model may be a generative adversarial network (GAN) model.

The first image may be at least one of a service point image indicating a service point or an item image, the service point image may be an image indicating a service point, and the item image may be an image indicating an item provided by the service point.

The second image may be one of a service point image and an item image.

The service point may be a drive-through (DT) service provision place within a predetermined range from the mobility.

When transmission and reception between the mobility and the service point are performed based on a short-range communication network, the predetermined range may be a range in which transmission and reception are possible through the short-range communication network.

The item may be at least one of a product provided by the service point, a service provided by the service point or information on the service point.

When the first image is a service point image, the controller may determine the second image as a preset service point image and determine whether the first image is similar to the second image.

Upon determining that the first image is similar to the second image, the controller may perform at least one of change of a driving route of the mobility to the service point, provision of a notice of a driving route to be changed to the passenger or inducing the passenger to select a route by providing the driving route to be changed to the passenger.

When the first image is an item image, the controller may determine the second image as a preset item image and determine whether the first image is similar to the second image.

Upon determining that the first image is similar to the second image, the controller may perform at least one of change of a driving route of the mobility to a service point for providing the item, provision of a notice of a driving route to be changed to the passenger, inducing the passenger to select a route by providing the driving route to be changed to the passenger or transmission of an order signal of the item.

The controller may be further configured to determine whether the result of determination suits an intention of the passenger.

According to the present disclosure, a method of generating an image using brain wave signals includes collecting brain wave signals of at least one passenger in a mobility from a plurality of channels for a predetermined time, generating a first image of a service point from the brain wave signals collected from the plurality of channels using an artificial intelligence model, determining whether the generated first image is similar to a preset second image, and controlling the mobility based on a result of determination.

The brain wave signals collected from the plurality of channels may be brain wave signals in at least one of a time domain, a frequency domain or a spatial domain.

The artificial intelligence model may be a generative adversarial network (GAN) model.

The first image may be at least one of a service point image indicating a service point or an item image, the service point image may be an image indicating a service point, and the item image may be an image indicating an item provided by the service point.

The second image may be one of a service point image and an item image.

The service point may be a drive-through (DT) service provision place within a predetermined range from the mobility.

When transmission and reception between the mobility and the service point are performed based on a short-range communication network, the predetermined range may be a range in which transmission and reception are possible through the short-range communication network.

The item may be at least one of a product provided by the service point, a service provided by the service point or information on the service point.

When the first image is a service point image, the determining of whether the first image is similar to the second image may include determining the second image as a preset service point image and determining whether the first image is similar to the second image.

Upon determining that the first image is similar to the second image, the controlling of the mobility may include performing at least one of change of a driving route of the mobility to the service point, provision of a notice of a driving route to be changed to the passenger or inducing the passenger to select a route by providing the driving route to be changed to the passenger.

When the first image is an item image, the determining of whether the first image is similar to the second image may include determining the second image as a preset item image and determining whether the first image is similar to the second image.

Upon determining that the first image is similar to the second image, the controlling of the mobility may include performing at least one of change of a driving route of the mobility to a service point for providing the item, provision of a notice of a driving route to be changed to the passenger, inducing the passenger to select a route by providing the driving route to be changed to the passenger or transmission of an order signal of the item.

The method may further include determining whether the result of determination suits an intention of the passenger.

The features briefly summarized above with respect to the present disclosure are merely exemplary aspects of the detailed description below of the present disclosure, and do not limit the scope of the present disclosure.

BRIEF DESCRIPTION OF THE FIGURES

In order that the disclosure may be well understood, there will now be described various forms thereof, given by way of example, reference being made to the accompanying drawings, in which:

FIG. 9 is a flowchart illustrating a method of operating an image generation apparatus according to an embodiment of the present disclosure.

FIG. 10 is a flowchart illustrating a method of operating an image generation apparatus according to an embodiment of the present disclosure.

DETAILED DESCRIPTION

Figure 1:
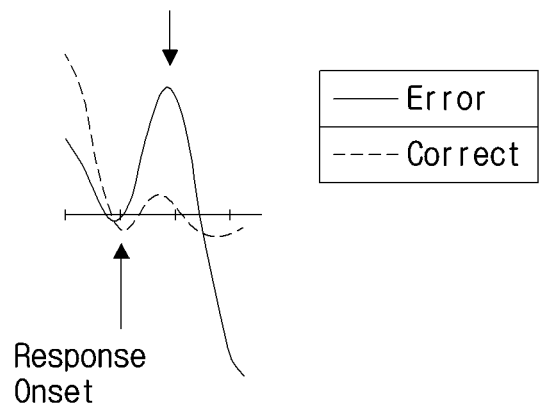
FIG. 1 is a view illustrating a general waveform of ERN in one form of the present disclosure.

The following description is merely exemplary in nature and is not intended to limit the present disclosure, application, or uses. It should be understood that throughout the drawings, corresponding reference numerals indicate like or corresponding parts and features.

The following description is merely exemplary in nature and is not intended to limit the present disclosure, application, or uses. It should be understood that throughout the drawings, corresponding reference numerals indicate like or corresponding parts and features.

Exemplary forms of the present disclosure will be described in detail such that the ordinarily skilled in the art would easily understand and implement an apparatus and a method provided by the present disclosure in conjunction with the accompanying drawings. However, the present disclosure may be embodied in various forms and the scope of the present disclosure should not be construed as being limited to the exemplary forms.

In describing forms of the present disclosure, well-known functions or constructions will not be described in detail when they may obscure the spirit of the present disclosure.

In the present disclosure, it will be understood that when an element is referred to as being "connected to", "coupled to", or "combined with" another element, it can be directly connected or coupled to or combined with the another element or intervening elements may be present therebetween. It will be further understood that the terms "comprises", "includes", "have", etc. when used in the present disclosure specify the presence of stated features, integers, steps, operations, elements, components, and/or combinations thereof but do not preclude the presence or addition of one or more other features, integers, steps, operations, elements, components, and/or combinations thereof.

It will be understood that, although the terms "first", "second", etc. may be used herein to describe various elements, these elements should not be limited by these terms. These terms are only used to distinguish one element from another element and not used to show order or priority among elements. For instance, a first element discussed below could be termed a second element without departing from the teachings of the present disclosure. Similarly, the second element could also be termed as the first element.

In the present disclosure, distinguished elements are termed to clearly describe features of various elements and do not mean that the elements are physically separated from each other. That is, a plurality of distinguished elements may be combined into a single hardware unit or a single software unit, and conversely one element may be implemented by a plurality of hardware units or software units. Accordingly, although not specifically stated, an integrated form of various elements or separated forms of one element may fall within the scope of the present disclosure. Also, the terms, such as 'unit' or 'module', etc., should be understood as a unit that processes at least one function or operation and that may be embodied in a hardware manner (e.g., a processor), a software manner, or a combination of the hardware manner and the software manner.

In the present disclosure, all of the constituent elements described in various forms should not be construed as being essential elements but some of the constituent elements may be optional elements. Accordingly, forms configured by respective subsets of constituent elements in a certain form also may fall within the scope of the present disclosure. In addition, forms configured by adding one or more elements to various elements also may fall within the scope of the present disclosure.

As an electrical activity of neurons constituting a brain, a brain wave signal (or brain signal, brain wave) means a bio signal that directly and indirectly reflects a conscious or unconscious state of a person. A brain wave signal can be measured in every area of human scalp, and its wavelength has a frequency of mainly 30 Hz or below and a potential difference of scores of microvolts. Depending on brain activity and state, various waveforms may appear. A research on interface control using a brain wave signal according to a person's intention is under way. A brain wave signal may be obtained by using EEG (Electro Encephalo Graphy) using electrical signals caused by brain activities, MEG (Magneto Encephalo Graphy) using magnetic signals occurring with electrical signals, and fMRI (functional Magnetic Resonance Imaging) or fNIRS (Near-Infrared Spectroscopy) using a change of oxygen saturation in the blood. Although fMRI and fNIRS are useful techniques for measuring brain activities, fMRI has a low time-resolution and fNIRS has a low spatial-resolution in general. Due to these limitations, EEG signals are mostly used by virtue of excellent portability and time-resolution.

A brain wave signal changes spatially and over time according to brain activity. As a brain wave signal is usually difficult to analyze and its waveform is not easy to visually analyze, various processing methods are proposed.

For example, according to the number of oscillations (frequency), brain wave signals may be classified based on frequency bands (Power spectrum classification). The classification considers a measured brain wave signal as a linear sum of simple signals at each specific frequency, decomposes the signal into each frequency component and indicates a corresponding amplitude. A brain wave signal at each frequency may be obtained by using pre-processing normally for noise elimination, the Fourier transform into frequency domain, and a band-pass filter (BPF).

More particularly, according to frequency band, brain waves may be classified into delta, theta, alpha, beta and gamma waves. Delta waves are brain waves with a frequency of 3.5 Hz or below and an amplitude of 20~200 µV, mainly appearing in normal deep sleep or newborns. In addition, delta waves may increase as our awareness of the physical world decreases. Generally, theta waves are brain waves with a frequency of 3.5~7 Hz, mainly appearing in emotionally stable states or in sleep.

In addition, theta waves are generated mainly in the parietal cortex and in the occipital cortex and may appear during calm concentration for recollecting a memory or meditating. Generally, alpha waves are brain waves with a frequency of 8~12 Hz, mainly appearing in relaxed and comfortable states. In addition, alpha waves are normally generated in the occipital cortex during rest and may diminish in sleep. Generally, beta waves are brain waves with a frequency of 13~30 Hz, mainly appearing in a state of tension, which is bearable enough, or while a certain level of attention is paid. In addition, beta waves are mainly generated in the frontal cortex and are related to an awakened state or concentrated brain activities, pathological phenomena and medicinal effects. Beta waves may appear in a wide area throughout the brain. In addition, specifically, the beta waves may be divided into SMR waves with a frequency of 13~15 Hz, mid-beta waves with a frequency of 15~18 Hz and high beta waves with a frequency of 20 Hz and above. As beta waves appear to be stronger under stress like anxiety and tension, they are called stress waves. Gamma waves are brain waves that generally have a frequency of 30~50 Hz, mainly appearing in a strongly excited state or during high-level cognitive information processing. In addition, gamma waves may appear in an awaking state of consciousness and during REM sleep and may also be overlapped with beta waves.

Each of the brain wave signals according to frequency band is associated with a specific cognitive function. For example, delta waves are associated with sleep, theta waves are associated with working memory, and alpha waves are associated with attention or inhibition. Thus, the property of a brain wave signal at each frequency band selectively displays a specific cognitive function. In addition, the brain wave signal at each frequency band may show a little different aspect in each measuring part on the surface of head. The cerebral cortex may be divided into frontal cortex, parietal cortex, temporal cortex and occipital cortex. These parts may have a few different roles. For example, the occipital cortex corresponding to the back of head has the primary visual cortex and thus can primarily process visual information. The parietal cortex located near the top of head has the somatosensory cortex and thus can process motor/sensory information. In addition, the frontal cortex can process information related to memory and thinking, and the temporal cortex can process information related to auditory sense and olfactory sense.

Meanwhile, for another example, a brain wave signal may be analyzed by using ERP (Event-Related Potential). ERP is an electrical change in a brain in association with a stimulus from outside or a psychological process inside. ERP means a signal including an electrical activity of the brain, which is caused by a stimulus including specific information (for example, image, voice, sound, command of execution, etc.) after a certain time since the stimulus is presented.

To analyze an ERP, a process of separating a signal from a noise is desired. An averaging method may be mainly used. Particularly, by averaging brain waves measured based on stimulus onset time, it is possible to remove brain waves, which are not related to a stimulus, and to pick out only a related potential, that is, a brain activity commonly associated with stimulus processing.

As ERP has a high time resolution, it is closely related to a research on cognitive function. ERP is an electrical phenomenon that is evoked by an external stimulus or is related to an internal state. According to types of stimuli, ERPs may be classified into auditory sense-related potentials, sight-related potentials, somatic sense-related potentials and olfactory sense-related potentials. According to properties of stimuli, ERPs may be classified into exogenous ERPs and endogenous ERPs. Exogenous ERPs have a waveform determined by an external stimulus, are related to automatic processing, and mainly appear in the initial phase of being given the stimulus. For example, exogenous ERPs are brainstem potentials. On the other hand, endogenous ERPs are determined by an internal cognitive process or a psychological process or state, irrespective of stimuli, and are related to 'controlled processing'. For example, endogenous ERPs are P300, N400, P600, CNV (Contingent Negative Variation), etc.

Names given to ERP peaks normally include a polarity and a latent period, and the peak of each signal has an individual definition and meaning. For example, the positive potential is P, the negative potential is N, and P300 means a positive peak measured about 300 ms after the onset of a stimulus. In addition, 1, 2, 3 or a, b, c and the like are applied according to the order of appearance. For example, P3 means a third positive potential in waveform after the onset of a stimulus.

Hereinafter, various ERPs will be described.

For example, N100 is related to a response to an unpredictable stimulus.

MMN (Mismatch Negativity) may be generated not only by a focused stimulus but also by non-focused stimulus. MMN may be used as an indicator for whether or not a sense memory (echoic memory) operates before initial attention. P300, which will be described below, appears in a process of paying attention and making judgment, while MMN is analyzed as a process occurring in the brain before paying attention.

For another example, N200 (or N2) is mainly generated according to visual and auditory stimuli and is related to short-term memory or long-term memory, which are types of memories after attention, along with P300 described below.

For yet another example, P300 (or P3) mainly reflects attention to a stimulus, stimulus cognition, memory search and alleviation of uncertain feeling and is related to perceptual decision distinguishing stimuli from outside. As the generation of P300 is related to a cognitive function, P300 is generated irrespective of types of presented stimuli. For example, P300 may be generated in auditory stimuli, visual stimuli and somatic stimuli. P300 is widely applied to a research on brain-computer interface.

For yet another example, N400 is related to language processing and is caused when a sentence or an auditory stimulus with a semantic error is presented. In addition, N400 is related to a memory process and may reflect a process of retrieving or searching information from long-term memory.

For yet another example, as an indicator showing reconstruction or recollective process, P600 is related to a process of processing a stimulus more accurately based on information stored in long-term memory.

For yet another example, CNV refers to potentials appearing for 200~300 ms and even for a few seconds in the later phase. It is also called slow potentials (SPs) and is related to expectancy, preparation, mental priming, association, attention and motor activity.

For yet another example, ERN (Error-Related Negativity) or Ne (error negativity) is an event-related potential (ERP) generated by a mistake or an error. It may occur when a subject makes a mistake in a sensorimotor task or a similar task. More particularly, when a subject cognizes a mistake or an error, ERN is generated and its negative peak appears mainly in the frontal and central zones for about 50~150 ms. Especially, it may appear in a situation where a mistake related to motor response is likely to occur, and may also be used to indicate a negative self-judgment.

Hereinafter, the major features of ERN will be described in more detail.

FIG. 1 is a view illustrating a general waveform of ERN according to one form of the present disclosure.

Referring to FIG. 1, negative potential values are depicted above the horizontal axis, and positive potential values are depicted below the horizontal axis. In addition, it can be confirmed that an ERP with a negative peak value is generated within a predetermined time range after a response onset for an arbitrary motion. Herein, the response may mean a case where a mistake or an error is made (Error Response). In addition, the predetermined time range may be about 50~150 ms. Alternatively, the predetermined time range may be about 0~100 ms. Meanwhile, in the case of a correct response, an ERP is generated which has a relatively smaller negative peak than ERN.

As an ERP of initial negativity, ERN is time-locked until a response error occurs. In addition, ERN is known to reflect the reinforcement activity of a dopaminergic system related to behavioral monitoring. ERN includes the fronto-striatal loop including the rostral cingulate zone. Meanwhile, dopamine is associated with the reward system of brain that usually forms a specific behavior and motivates a person thereby providing pleasure and reinforced feelings. When a behavior obtaining an appropriate reward is repeated, it is learned as a habit. In addition, more dopamine is released through emotional learning, and a new behavior is attempted due to the release of dopamine. Thus, reward-driven learning is called reinforcement learning.

In addition, ERN may be generated in 0~100 ms after the onset of an erroneous response that is caused during an interference task (for example, Go-noGo task, Stroop task, Flanker task, and Simon task) through the frontal cortex lead.

In addition, together with CRN described below, ERN is known to reflect a general behavior monitoring system that can distinguish a right behavior and a wrong behavior.

In addition, the fact that ERN reaches a maximum amplitude at the frontal cortex electrode is known to reflect that an intracerebral generator is located in the rostral cingulate zone or the dorsal anterior cingulate cortex (dACC) zone.

In addition, ERN may show a change of amplitude according to a negative emotional state.

In addition, ERN may be reported even in a situation where behavioral monitoring is performed based on external evaluation feedback processing unlike internal motor expression, and may be classified as FRN described below.

In addition, ERN may be generated not only when having cognized a mistake or an error but also before cognizing the mistake or the error.

In addition, ERN may be generated not only as a response to his/her own mistake or error but also as a response to a mistake or error of others.

In addition, ERN may be generated not only as a response to a mistake or an error but also as a response to anxiety or stress for a predetermined performance task or object.

In addition, as a larger peak value of ERN is obtained, it may be considered as reflecting a more serious mistake or error.

Meanwhile, for yet another example, being an event-related potential (ERP) that is generated after ERN, Pe (Error Positivity) is an ERP with a positive value, which is generated mainly at the frontal cortex electrode in about 150~300 ms after a mistake or an error. Pe is known as a reaction that realizes a mistake or an error and pays more attention. In other words, Pe is related to an indicator of a conscious error information processing process after error detection. ERN and Pe are known as ERPs related to error monitoring.

Hereinafter, the major features of Pe will be described in more detail.

Figure 2:
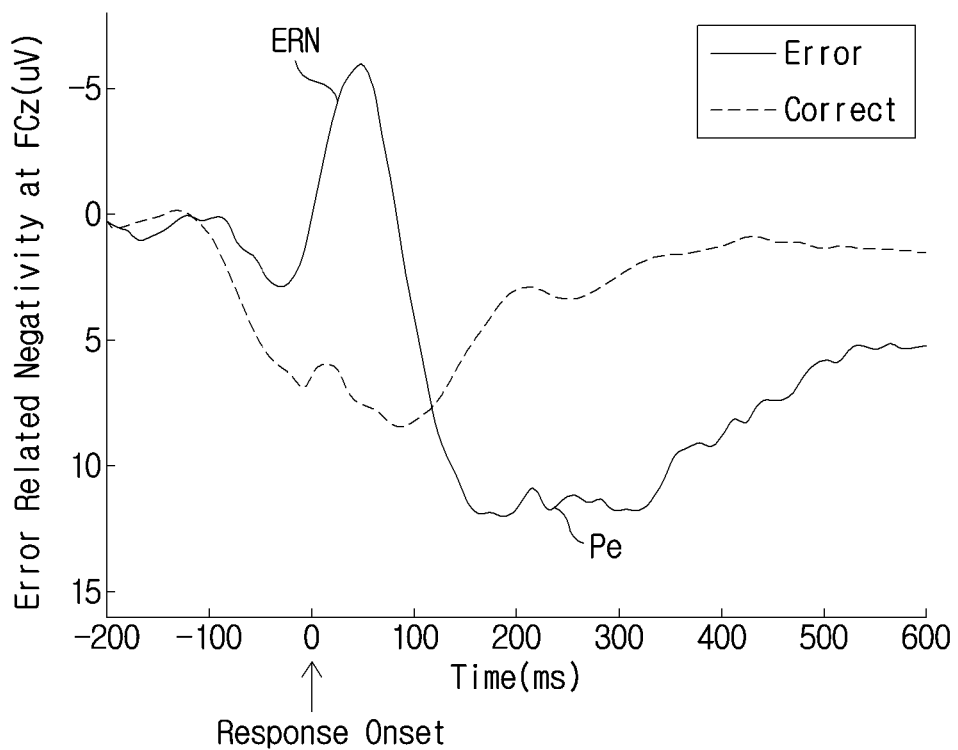
FIG. 2 is a view illustrating general waveforms of ERN and Pe according to one form of the present disclosure.

FIG. 2 is a view illustrating general waveforms of ERN and Pe according to another form of the present disclosure.

Referring to FIG. 2, negative potential values are depicted above positive potential values. In addition, it can be confirmed that an ERP with a negative peak value, that is, an ERN is generated within a first predetermined time range after a response onset for an arbitrary motion. Herein, the response may mean a case where a mistake or an error is made (Error Response). In addition, the first predetermined time range may be about 50~150 ms. Alternatively, the first predetermined time range may be about 0~200 ms.

In addition, it can be confirmed that an ERP with a positive peak value, that is, a Pe is generated within a second predetermined time range after the onset of the ERN. In addition, the second predetermined time range may be about 150~300 ms after an error onset. Alternatively, the second predetermined time range may mean about 200~400 ms.

Figure 3:
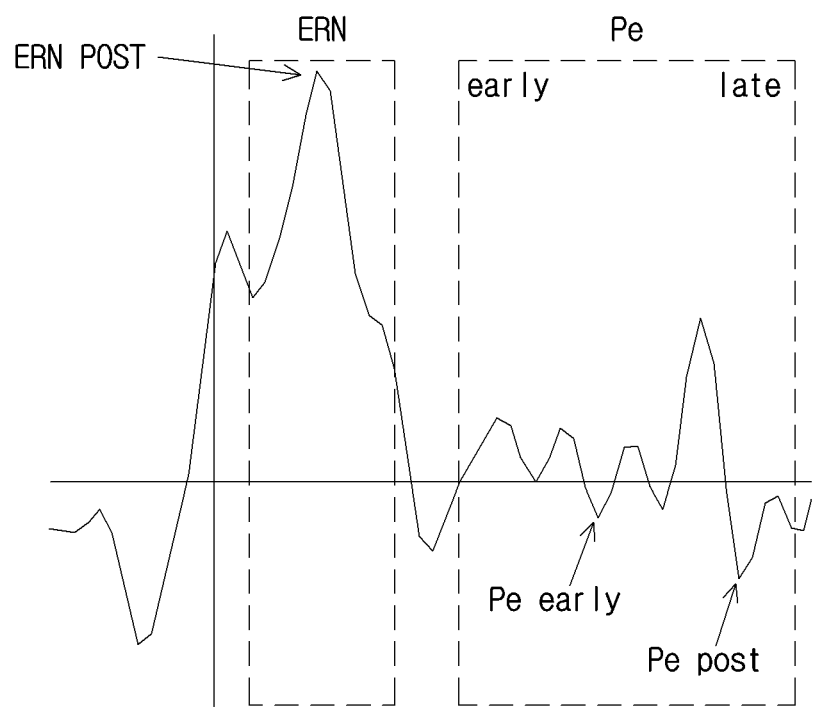
FIG. 3 is a view illustrating a deflection characteristic of Pe according to another form of the present disclosure.

FIG. 3 is a view illustrating a deflection characteristic of Pe in one form of the present disclosure.

Referring to FIG. 3, like P3, Pe has a wide deflection characteristic, and the plexus generator includes not only the areas of posterior cingulate cortex and insula cortex but also more anterior cingulate cortex.

In addition, Pe may reflect an emotional evaluation of an error and an attention to a stimulus like P300. In addition, ERN indicates a conflict between a right response and a wrong response, and Pe is known to be a response that realizes a mistake and pays more attention. In other words, ERN may be generated in a process of detecting a stimulus, and Pe may be generated depending on attention in a process of processing a stimulus. When ERN and/or Pe have relatively large values respectively, it is known that the values are related to an adaptive behavior intended to respond more slowly and more accurately after a mistake.

Figure 4A:
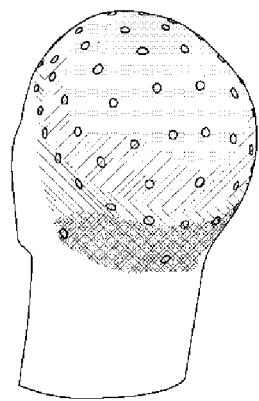
FIGS. 4A and 4B are views respectively illustrating measurement areas of ERP and Pe in one form of the present disclosure.
Figure 4B:
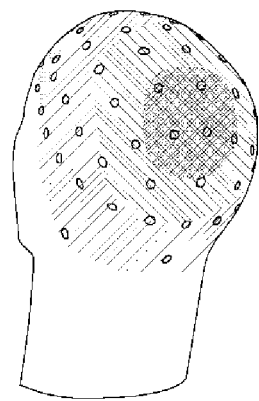

FIGS. 4A and 4B are views illustrating measurement areas of ERP and Pe according to one form of the present disclosure.

ERN and Pe are known as ERPs related to error monitoring. Regarding the measurement areas of ERN and Pe, a largest negative value and a largest positive value may normally be measured in the central area. However, there may be a little difference according to measurement conditions. For example, FIG. 4A is the main area where ERN is measured, and the largest negative value of ERN may normally be measured in the midline frontal or central zone (that is, FCZ). In addition, FIG. 4B is the main area where Pe is measured, and a large positive value of Pe may normally be measured in a posterior midline zone as compared to ERN.

Meanwhile, for yet another example, FRN (Feedback-Related Negativity) is an event-related potential (ERP) that is related to error detection obtained based on external evaluation feedback. ERN and/or Pe detect an error based on an internal monitoring process. However, in the case of FRN, when being obtained based on external evaluation feedback, it may operate similarly to the process of ERN.

In addition, FRN and ERN may share many electrophysiological properties. For example, FRN has a negative peak value at the frontal cortex electrode in about 250~300 ms after the onset of a negative feedback and may be generated in the dorsal anterior cingulate cortex (dACC) zone like ERN.

In addition, like ERN, FRN may reflect an activity of reinforcement learning by a dopaminergic system. In addition, FRN normally has a larger negative value than a positive feedback and may have a larger value for an unforeseen case than for a predictable result.

Figure 5:
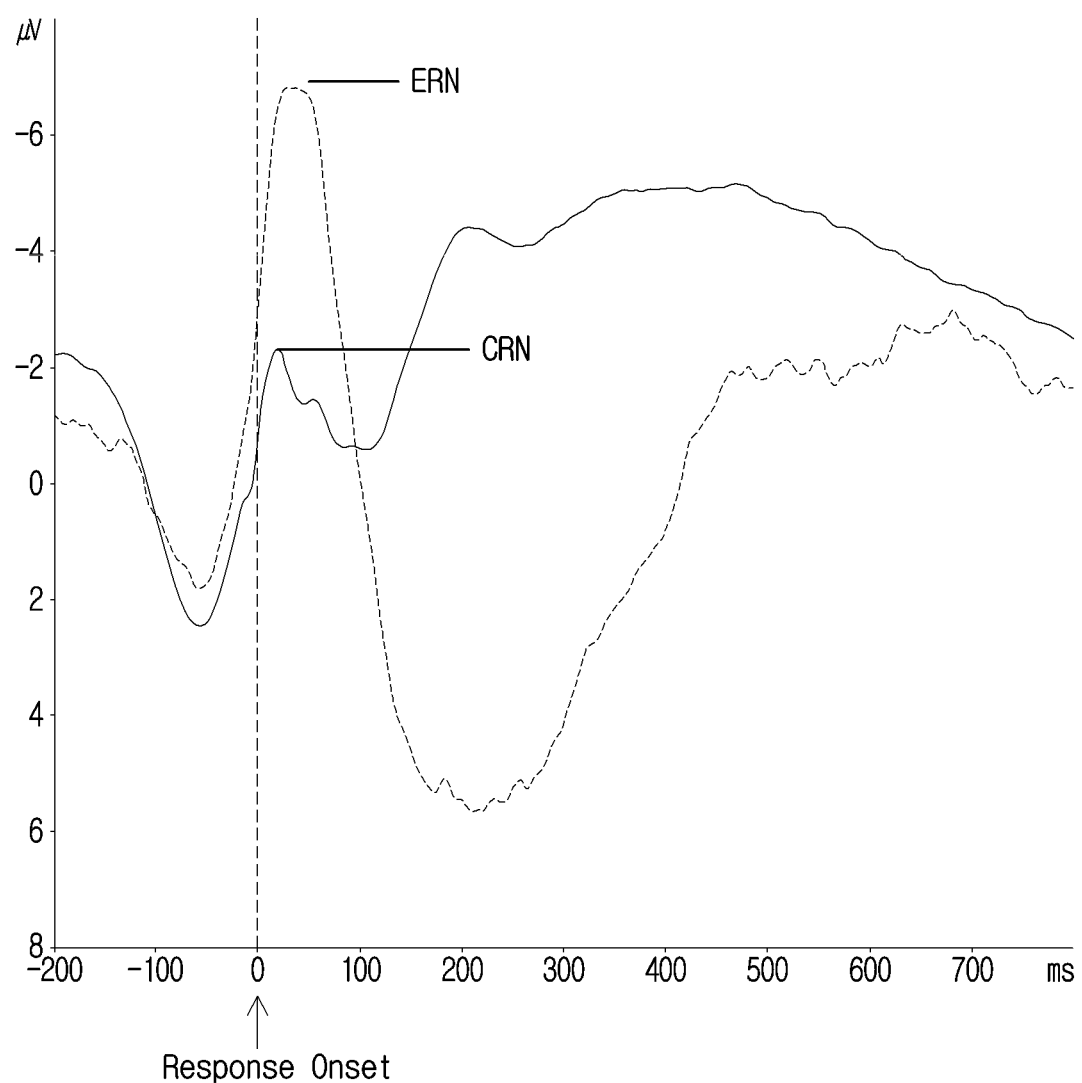
FIG. 5 is a view illustrating general waveforms of ERN and CRN according to one form of the present disclosure.

For yet another example, CRN (Correct-Related Negativity) is an ERP generated by a correct trial and is a negative value that is smaller than ERN. Like ERN, CRN may be generated in the initial latent period (for example, 0~100 ms). FIG. 5 is a view illustrating general waveforms of ERN and CRN in one form of the present disclosure.

For yet another example, Pc (Correct Positivity) is an event-related potential generated following CRN. It is an event-related potential generated in about 150~300 ms after the onset of correct response. The relation between CRN and Pc may be similar to the relation between ERN and Pe.

Meanwhile, ERPs may be classified into stimulus-locked ERPs and response-locked ERPs. The stimulus-locked ERPs and the response-locked ERPs may be divided according to criteria like evoking cause of ERP and response time. For example, an ERP evoked from a moment when a word or a picture is presented to a user from outside may be called a stimulus-locked ERP. In addition, for example, an ERP evoked from a moment when a user speaks or pushed a button may be called a response-locked ERP. Accordingly, based on the above-described criterion, in general, stimulus-locked ERPs are N100, N200, P2, P3, etc., and response-locked ERPs are ERN, Pe, CRN, Pc, FRN, etc.

Meanwhile, brain waves may be classified according to manifesting motives. Brain waves may be classified into spontaneous brain waves (spontaneous potentials) manifested by a user's will and evoked brain waves (evoked potentials) that are naturally manifested according to external stimuli irrespective of the user's will. Spontaneous brain waves may be manifested when a user moves on his/her own or imagines a movement, while evoked brain waves may be manifested by visual, auditory, olfactory and tactile stimuli, for example.

Meanwhile, brain wave signals may be measured in accordance with the International 10-20 system. The International 10-20 system determines measurement points of brain wave signals on the basis of the relationship between the location of an electrode and the cerebral cortex areas.

Figure 6:
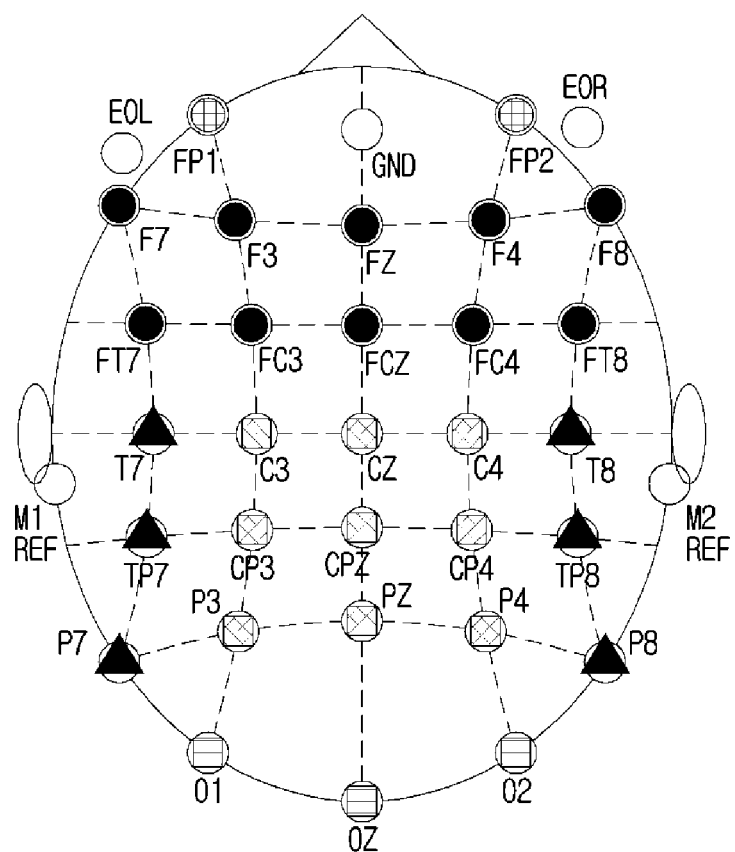
FIG. 6 is a view illustrating EEG measurement channels corresponding to cerebral cortex areas in one form of the present disclosure.

FIG. 6 is a view illustrating EEG measurement channels corresponding to the cerebral cortex areas according to one form of the present disclosure.

Referring to FIG. 6, brain areas (Prefrontal cortex FP1, FP2; Frontal cortex F3, F4, F7, F8, FZ, FC3, FC4, FT7, FT8, FCZ; Parietal cortex C3, C4, CZ, CP3, CP4, CPZ, P3, P4, PZ; Temporal cortex T7, T8, TP7, TP8, P7, P8; Occipital cortex O1, O2, OZ) correspond to 32 brain wave measurement channels. For each of the channels, data may be obtained and analysis may be performed for each cerebral cortex area by using the data.

Figure 7:
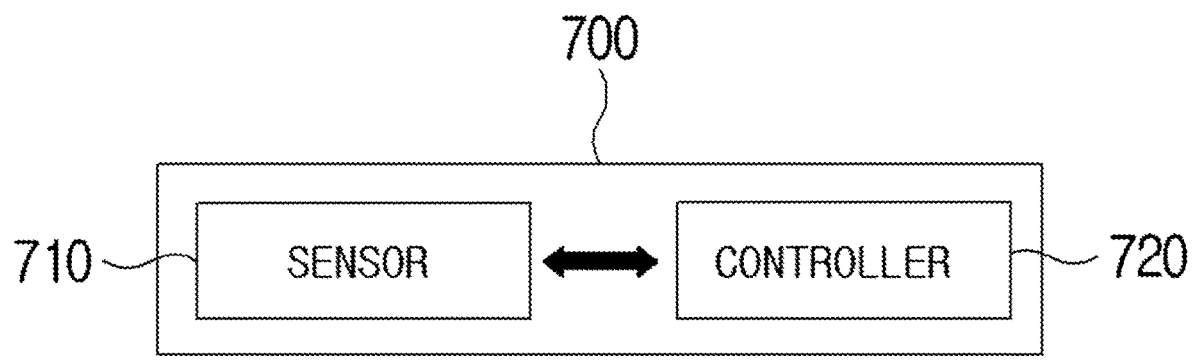
FIG. 7 is a block diagram illustrating a configuration of an apparatus for generating an image based on a brain wave signal of a passenger according to an embodiment of the present disclosure.

FIG. 7 is a block diagram illustrating a configuration of an apparatus for generating an image based on a brain wave signal of a passenger according to an embodiment of the present disclosure.

A drive-through (DT) service refers to a service which allows customers to order, pay for and pick up certain products in a state of riding in a mobility without parking. Since parking or waiting in line is not necessary, the DT service has been in the spotlight as an efficient and convenient service for customers. Recently, the DT service is gradually becoming popular. For example, passengers in mobilities may conveniently and easily use the DT services provided by fast food stores and coffee shops in daily life at downtown areas and highways. The mobility may include a vehicle, a mobile/transport device, etc.

Meanwhile, in the current DT service, a passenger generally orders desired items after reaching a place or position (hereinafter referred to as a DT point) where the DT service is provided. In the present disclosure, an image generation apparatus and method capable of selecting and ordering an item (hereinafter referred to as a DT item) provided by a DT point in a mobility before reaching the DT point may be provided.

Here, the DT point may be a DT service provision place located within a predetermined range from the mobility.

In addition, the DT point of the present disclosure may include not only a place for providing a DT service but also an office capable of providing a DT item to a mobility and receiving information on an item selected and ordered by the mobility without providing the DT service. For example, the DT point of the present disclosure may mean an office where a customer in a mobility may select and order an item provided by the DT point but needs to park/stop the mobility at a separate place in order to pick up the ordered item. That is, the DT point of the present disclosure may include a drive-in office without a drive-through path.

The image generation apparatus of the present disclosure may generate an image related to a DT point from the brain wave signal of a passenger using an artificial intelligence model. For example, an image related to a menu or a product provided by the DT point may be generated. In addition, the image generation apparatus of the present disclosure may select an image included in a predetermined list based on the generated image. For example, the image included in the list of products or a predetermined menu provided by the DT point may be selected. In addition, the image generation apparatus of the present disclosure may control the mobility or provide predetermined product information selected by the passenger to the DT point, based on the selected image.

Meanwhile, artificial intelligence technology enables computers to learn data and to autonomously make decision like human. An artificial neural network is a mathematical model inspired by a biological neural network and may mean a whole model having a problem-solving ability by allowing artificial neurons that form a network by synaptic connections to change the strength of the synaptic connections through learning. The artificial neural network may include an input layer, a hidden layer and an output layer. Neurons included in each layer are connected through weights and the artificial neural network may have a form capable of approximating a complex function through a linear combination of weights and neuron values and a nonlinear activation function. The purpose of learning of the artificial neural network is to find a weight which minimizes a difference between the output calculated at the output layer and an actual output value.

A deep neural network is an artificial neural network composed of multiple hidden layers between an input layer and an output layer and may model complex nonlinear relationships through many hidden layers. A neural network structure capable of advanced abstraction by increasing the number of layers is referred to as deep learning. In deep learning, since a very large amount of data is learned and an answer having a highest probability is selected based on the result of learning when new data is input, operation may be adaptively performed according to the image, and characteristic factors may be automatically found in a process of learning a model based on data.

The deep learning based model of the present disclosure may include, but is not limited to, a fully convolutional neural network, a convolutional neural network (CNN), a recurrent neural network (RNN), a restricted Boltzmann machine (RBM) and a deep belief neural network (DBN). Alternatively, a machine learning method may be included in addition to deep learning or a hybrid model which is a combination of deep learning and machine learning may be included. For example, the features of the image may be extracted by applying the deep learning based model, and the images are classified and recognized based on the extracted features by applying the machine learning based model. The machine learning based model may include, but is not limited to, support vector machine (SVM), AdaBoost, etc. Here, the RNN may include a long short-term memory (LSTM).

In addition, the method of learning the deep learning based model of the present disclosure may include, but is not limited to, at least one of supervised learning, unsupervised learning or reinforcement learning. Supervised learning is performed using a series of learning data and a label (target output value) corresponding thereto, and a neural network model based on supervised learning may be a model for inferring a function from training data. In supervised learning, a series of learning data and a target output value corresponding thereto are received, errors are found through learning to compare an actual output value of input data with the target output value, and the model is modified based on the corresponding result. Supervised learning may be classified into regression, classification, detection, semantic segmentation according to the form of the result. The function derived through supervised learning may be used to predict a new result value again. The neural network model based on supervised learning optimizes the parameters of the neural network model through learning of a lot of training data.

Unsupervised learning is a methodology in which learning is performed without labeling data, unlike supervised learning. That is, unsupervised learning means a learning method of teaching a learning algorithm without known output values or information, and the learning algorithm should extract knowledge from data using only input data. For example, unsupervised transformation may mean a method of newly representing data such that a person or another machine learning algorithm more easily interprets the new data than original data. For example, dimensionality reduction may be transformed to include only necessary features while reducing the number of characteristics from many high-dimensional data. As another example, clustering may mean a method of dividing data having similar characteristics into groups, that is, mean grouping with common features appearing on pictures without labels.

As another example, there is a generative adversarial network (GAN) model that has been actively researched in the field of creating or restoring images or the field of mimicking motion. The GAN model may mean an artificial neural network or deep learning in which two types of opposing systems perform learning in a manner of competing with each other, and may mean an algorithm for learning a model created by deep learning using an adversarial learning method in order to solve a generative problem. The GAN model may learn information through a process in which a generator and a discriminator compete with each other. Specifically, the generator may serve to generate imitation data similar to existing data and the discriminator may lose the function of discrimination if the imitation data of the generator is close to actual data. In addition, the discriminator may serve to determine whether input data is actual data or imitation data, and learning may end if the discriminator determines that the imitation data calculated by the generator is true with a probability of 50%. Meanwhile, the GAN model of the present disclosure may include a deep convolutional GAN (DCGAN) model capable of more stable learning.

Referring to FIG. 7, the image generation apparatus 700 may include a sensor 710 and/or a controller 720. It should be noted, however, that only some of the components necessary for explaining the present embodiment are shown, and the components included in the image generation apparatus 700 are not limited to the above-described example. For example, two or more constituent units may be implemented in one constituent unit, and an operation performed in one constituent unit may be divided and executed in two or more constituent units. Also, some of the constituent units may be omitted or additional constituent units may be added.

The image generation apparatus 700 of the present disclosure may collect brain wave signals of at least one passenger in a mobility from a plurality of channels for a predetermined time. In addition, the sensor 710 may perform the above operation.

Here, the brain wave signals collected from the plurality of channels may mean the brain wave signals in at least one of a time domain, a frequency domain or a spatial domain. Here, the spatial domain may mean a brain wave signal measurement channel.

The image generation apparatus 700 of the present disclosure may generate a first image related to a service point from the brain wave signals collected from the plurality of channels using an artificial intelligence model. In addition, the controller 720 may perform the above operation.

Here, the service point may mean a DT point.

For example, the service point may be a DT service provision place within a predetermined range from the mobility. Alternatively, when the mobility is within the predetermined range from the service point, the mobility may receive information on the item. The number or types of service points may vary according to the position of the mobility. The image generation apparatus 700 of the present disclosure may further include a receiver (not shown). The receiver may perform the above operation.

Figure 8:
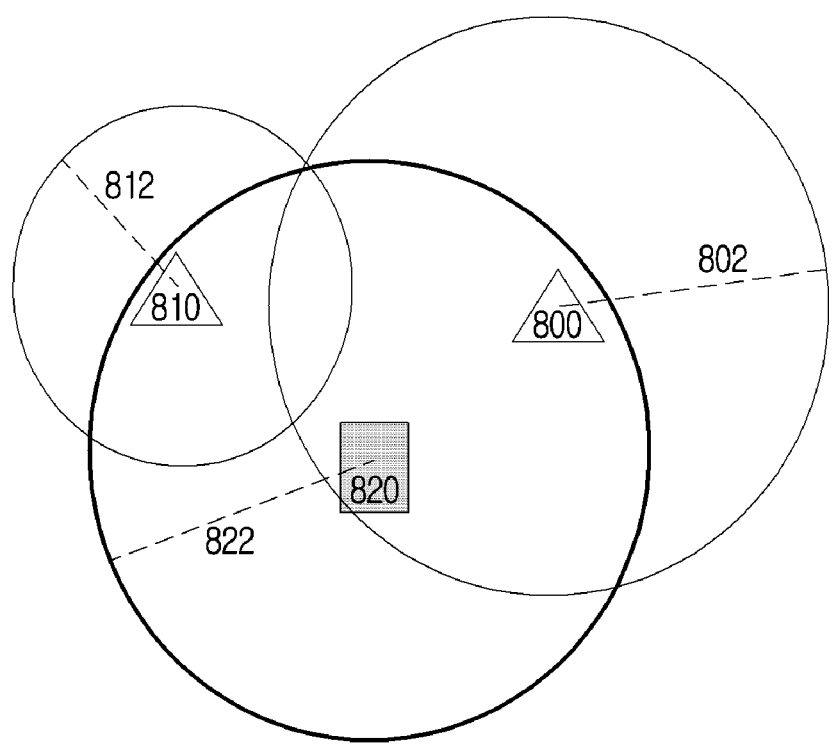
FIG. 8 is a view illustrating a range between a mobility and a service point, which mutually perform transmission and reception, according to an embodiment of the present disclosure.

FIG. 8 is a view illustrating a range between a mobility and a service point, which mutually perform transmission and reception, according to an embodiment of the present disclosure.

Referring to FIG. 8, a first service point 800 may transmit information on an item provided by the first service point 800 to a mobility 820 within a first range 802 from the first service point 800. In contrast, a second service point 810 does not have a mobility, to which information on an item may be transmitted, within a second range 812 from the second service point 810. Alternatively, the mobility 820 may receive the information on the item from the first service point 800 and the second service point 810 within a third range 822 from the mobility 820.

As another example, the service point may mean a place input by a user or a place predetermined in the mobility. Alternatively, the service point may mean a place which is automatically detected according to a predetermined condition in a navigation device of the mobility. The service point may be differently set according to the user in the mobility. For example, the service point may be set by input of a user's favorite service point.

As another example, the service points may be grouped according to the properties of the service provision place. For example, the service points may be grouped into a fast food store, a coffee shop, a bakery, a convenience store, a bank, a ticket office according to the properties or types of the provided items and services, and at least one of the grouped list may be selected according to selection of the passenger of the mobility. In addition, for example, the grouped list may be displayed on the display of the mobility and at least one of the grouped list may be selected according to selection of the passenger of the mobility as a response to the display.

Here, the predetermined range may mean a distance of a few kilometers or a few tens of kilometers from the mobility and/or the service point in a radial direction. In addition, the predetermined range may be set based on a communication network. For example, when transmission and reception between the mobility and the service point are performed based on a short-range communication network, the predetermined range may be a range in which transmission and reception are possible through the short-range communication network. At this time, a beacon may be used in the short-range communication network.

Here, the item may mean a DT item. For example, the item may mean products such as hamburger, coffee and bread. That is, the item may mean products to be purchased by the passenger.

In addition, the item may include a service provided by the service point.

In addition, the item may include the name, image, logo, etc. of the service point.

Here, the information on the item may mean information on a DT item.

For example, the information on the DT item may include the image, type, price, amount, name information of the item.

As another example, the information on the DT item may include predetermined information provided by the service point. For example, the information on the DT item may include new menus, events, discount events, etc. provided by the service point.

As another example, the information on the DT item may be set based on the preference of the passenger. To this end, the information on the DT item may be a result of performing learning in advance according to the passenger. In addition, the information on the DT item may be updated in real time.

Meanwhile, the artificial intelligence model may mean a generative adversarial network (GAN) model. The GAN model may include a deep convolutional GAN (DCGAN) model. In addition, the artificial intelligence model may mean a model obtained by combining an RNN-based model with a GAN model in order to process the brain wave signal.

The artificial intelligence model may be trained in advance with respect to the brain wave signal of the user and the image of the service point corresponding thereto using the GAN model. Here, the image of the service point may mean an image indicating a DT point or an image indicating the item provided by the DT point.

Here, the first image is at least one of a service point image indicating a service point or an item image. The service point image may mean an image indicating the service point and the item image may mean an image indicating an item provided by the service point. Here, the item image may mean the image of a product, a menu, goods, etc. provided by the DT point.

For example, when the first image is a service point image, the first image may mean the logo or shop image of a fast food store, a coffee shop, a bakery, a convenience store, a bank or a ticket office.

As another example, when the first image is an item image, the first image may mean the image of a hamburger or a beverage provided by a fast food store.

As another example, when the first image is an item image, the first image may mean the image of products provided by a bakery.

Meanwhile, in the process of generating the first image, the brain wave signals collected from the plurality of channels may pass through a predetermined encoder, thereby generating an EEG feature vector. Here, the predetermined encoder may include an LSTM layer and a nonlinear layer (e.g., a fully-connected layer including a ReLU nonlinear active function).

Referring to FIG. 7 again, the image generation apparatus 700 of the present disclosure may determine whether the first image is similar to a preset second image. In addition, the controller 720 may perform the above operation.

Here, the second image may mean a service point image or an item image.

For example, the image generation apparatus 700 of the present disclosure may determine similarity based on determination of similarity between the first image and the second image.

Here, for the determination of similarity, various similarity determination methods generally used in an image recognition or classification field, such as a method of extracting feature points of input images to determine similarity, are applicable.

In addition, upon determination of similarity, a degree of similarity between images may be compared with a predetermined threshold. The predetermined threshold may vary according to the first image and/or the second image. Here, the degree of similarity between the images may be expressed as a probability or a predetermined numerical value.

For example, the threshold when the first image is a service point image may be relatively less than the threshold when the first image is an item image. For example, if the threshold is 0.6 when the first image is a service point image, the threshold may be 0.8 when the first image is an item image. For example, if the threshold is 0.6 when the first image is a logo image of a coffee shop, the threshold may be 0.8 when the first image is a hamburger. That is, the degree of similarity between item images (e.g., hamburger and beverage images) may be generally greater than the degree of similarity between the service point images (e.g., fast food store and coffee shop images). By differentiating the thresholds, the degree of similarity between images when the first image is an item image may be more strictly determined than when the first image is a service point image.

As another example, the threshold when the first image is a "hamburger" image among item images may be relatively less than the threshold when the first image is a "beverage" image. For example, if the threshold is 0.5 when the first image is a "hamburger" image, the threshold may be 0.7 when the first image is a "beverage" image. That is, even in the case of item images of the same type, the degree of similarity of a specific item image may be more or less strictly determined than another item image.

That is, the image generation apparatus 700 of the present disclosure may select a service point determined to be intended by the passenger, by determining similarity. Alternatively, the image generation apparatus 700 of the present disclosure may select an item determined to be intended by the passenger, by determining similarity.

Here, the second image may be set by user input or may be preset in the mobility. In addition, the second image may be preset for each of the service point image and the item image. For example, the second image may be configured as a pair of (service point image, item image). For example, the second image may be configured as (fast food store, predetermined hamburger), (coffee shop, predetermined coffee), etc.

In addition, the second image may be determined based on the generated first image. For example, when the first image is a service point image, the second image may be determined as a preset service point image. Alternatively, when the first image is an item image, the second image may be determined as a preset item image. That is, the second image may be determined as an image matching the type of the first image in order to determine similarity between images.

Alternatively, the second image may be a preset image regardless of the generated first image. That is, the second image may be preset regardless of the property, type, etc. of the first image. For example, the second image may be a predetermined "hamburger" image regardless of whether the first image is a service point image or an item image. Alternatively, the second image may be a predetermined "coffee shop" image regardless of whether the first image is a service point image or an item image.

That is, the image generation apparatus 700 of the present disclosure may store a service point, in which the passenger frequently visits, or an item preferred by the passenger in the mobility in advance in the form of an image, and determine whether an image generated based on the brain wave signal of the passenger is similar to the stored image.

In addition, the image generation apparatus 700 of the present disclosure may control the mobility or provide predetermined information to the service point based on the result of determining similarity. In addition, the controller 720 may perform the above operation.

That is, as described above, the image generation apparatus 700 of the present disclosure may determine what is information intended or thought by the passenger, by using the determination of similarity. In addition, the mobility may be controlled or predetermined information may be transmitted to the service point to answer the purpose, according to the determination.

For example, upon determining that the first image is similar to the second image, the driving route may be changed to the service point corresponding to the selected second image or the driving route may be provided to the passenger to induce the passenger to select the route. Alternatively, a notice of the changed driving route may be provided to the passenger.

As another example, upon determining that the first image is similar to the second image, the order signal of the item corresponding to the second image may be transmitted to the service point. For example, when the first image is a "coffee" image and is determined to be similar to the preset second image, the order signal of the coffee may be transmitted to the coffee shop corresponding to the coffee. Alternatively, the driving route may be changed to the coffee shop corresponding to the coffee or the driving route may be provided to the passenger to induce the passenger to select the route. Alternatively, a notice of the changed driving route may be provided to the passenger.

FIG. 9 is a flowchart illustrating a method of operating an image generation apparatus according to an embodiment of the present disclosure.

In step S901, the brain wave signals of at least one passenger in the mobility may be collected from a plurality of channels for a predetermined time.

Here, the brain wave signals collected from the plurality of channels may mean the brain wave signals in at least one of a time domain, a frequency domain or a spatial domain.

In step S902, the first image of the service point may be generated from the brain wave signals collected from the plurality of channels using the artificial intelligence model.

Here, the artificial intelligence model may mean a generative adversarial network (GAN) model. The GAN model may include a deep convolutional GAN (DCGAN) model. In addition, the artificial intelligence model may mean a model obtained by combining an RNN-based model with a GAN model in order to process the brain wave signal.

Here, the first image is at least one of a service point image indicating a service point or an item image. The service point image may mean an image indicating the service point and the item image may mean an image indicating an item provided by the service point.

Meanwhile, the artificial intelligence model may be trained in advance with respect to the brain wave signal of the user and the image of the service point corresponding thereto using the GAN model. Here, the image of the service point may mean an image indicating a DT point or an image indicating the item provided by the DT point.

Meanwhile, in the process of generating the first image, the brain wave signals collected from the plurality of channels may pass through a predetermined encoder, thereby generating an EEG feature vector. Here, the predetermined encoder may include an LSTM layer and a nonlinear layer (e.g., a fully-connected layer including a ReLU nonlinear active function).

In step S903, whether the generated first image is similar to the preset second image may be determined.

Here, the second image may mean a service point image or an item image.

For example, the image generation apparatus 700 of the present disclosure may determine similarity based on determination of similarity between the first image and the second image.

Here, for the determination of similarity, various similarity determination methods generally used in an image recognition or classification field, such as a method of extracting feature points of input images to determine similarity, are applicable.

In addition, upon determination of similarity, a degree of similarity between images may be compared with a predetermined threshold. The predetermined threshold may vary according to the first image and/or the second image. Here, the degree of similarity between the images may be expressed as a probability or a predetermined numerical value.

In step S904, the mobility may be controlled or predetermined information may be provided to the service point based on the result of determination.

That is, what is information intended or thought by the passenger may be determined by using the determination of similarity. In addition, the mobility may be controlled or predetermined information may be transmitted to the service point to answer the purpose, according to the determination.

FIG. 10 is a flowchart illustrating a method of operating an image generation apparatus according to an embodiment of the present disclosure.

Meanwhile, the image generation apparatus of the present disclosure may update the artificial intelligence model through a process of generating a first image of a service point from the brain wave signal of the passenger and determining similarity between the generated first image and a preset second image. That is, the brain wave signal of the passenger and/or the first image may be added as learning data of the artificial intelligence model.

For example, the image generation apparatus of the present disclosure may further perform a process of determining whether the result of determining similarity suits the intention of the passenger. In addition, it is possible to increase or decrease a probability that the first image is generated in the artificial intelligence model depending on whether the second image suits the intention of the passenger.

Steps S1001 to S1003 may respectively correspond to steps S901 to S903 of FIG. 9 and thus detailed processes thereof have been described above with reference to FIG. 9.

In step S1004, the process of determining whether the result of determining similarity suits the intention of the passenger may be performed. For example, the preset second image or the name corresponding to the second image may be displayed on a predetermined display in the mobility, and, as a response to the display, user input of selecting "yes" or "no" may be received. Alternatively, the user may be enabled to determine whether the driving route is changed to the service point corresponding to the preset second image, and user input of selecting "yes" or "no" may be received as a response thereto. Alternatively, the user may be enabled to determine whether an order signal of an item corresponding to the preset second image is transmitted, and user input of selecting "yes" or "no" may be received as a response thereto.

In step S1005, the artificial intelligence model may be updated depending on whether the result of determination suits the intention of the passenger.

For example, when the result of determination suits the intention of the passenger, a probability that the first image is generated increases by a predetermined numerical value in the artificial intelligence model, and, when the result of determination does not suit the intention of the passenger, a probability that the first image is generated decreases by a predetermined numerical value in the artificial intelligence model.

According to the present disclosure, it is possible to provide an apparatus and method for generating an image based on a brain wave signal of a passenger.

According to the present disclosure, it is possible to provide an apparatus and method for generating an image from a brain wave signal of a passenger using an artificial intelligence model and controlling a mobility based on the generated image.

Effects obtained in the present disclosure are not limited to the above-mentioned effect, and other effects not mentioned above may be clearly understood by those skilled in the art from the following description.

Although exemplary methods of the present disclosure are described as a series of operation steps for clarity of a description, the present disclosure is not limited to the sequence or order of the operation steps described above. The operation steps may be simultaneously performed, or may be performed sequentially but in different order. In order to implement the method of the present disclosure, additional operation steps may be added and/or existing operation steps may be eliminated or substituted.

Various forms of the present disclosure are not presented to describe all of available combinations but are presented to describe only representative combinations. Steps or elements in various forms may be separately used or may be used in combination.

In addition, various forms of the present disclosure may be embodied in the form of hardware, firmware, software, or a combination thereof. When the present disclosure is embodied in a hardware component, it may be, for example, an application specific integrated circuit (ASIC), a digital signal processor (DSP), a digital signal processing device (DSPD), a programmable logic device (PLD), a field programmable gate array (FPGA), a general processor, a controller, a microcontroller, a microprocessor, etc.

The scope of the present disclosure includes software or machine-executable instructions (for example, operating systems (OS), applications, firmware, programs) that enable methods of various forms to be executed in an apparatus or on a computer, and a non-transitory computer-readable medium storing such software or machine-executable instructions so that the software or instructions can be executed in an apparatus or on a computer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. An apparatus for generating an image using brain wave signals, the apparatus comprising:
    a sensor configured to collect brain wave signals of at least one passenger in a mobility from a plurality of channels for a predetermined time; and
    a controller configured to generate a first image of a service point from the brain wave signals collected from the plurality of channels using an artificial intelligence model, to determine whether the generated first image is similar to a preset second image, and to control the mobility based on a result of the determination.

2. The apparatus of claim 1, wherein the brain wave signals collected from the plurality of channels are brain wave signals in at least one of a time domain, a frequency domain, or a spatial domain.

3. The apparatus of claim 1, wherein the artificial intelligence model is a generative adversarial network (GAN) model.

4. The apparatus of claim 1, wherein the first image is at least one of a service point image indicating a service point or an item image;
    wherein the service point image is an image indicating a service point and the item image is an image indicating an item provided by the service point; and
    wherein the service point is a drive-through (DT) service provision place within a predetermined range from the mobility.

5. The apparatus of claim 4, wherein the item is at least one of a product provided by the service point, a service provided by the service point, or information on the service point.

6. The apparatus of claim 4, wherein, when the first image is a service point image, the controller determines the second image as a preset service point image, and determines whether the first image is similar to the second image.

7. The apparatus of claim 6, wherein, upon determining that the first image is similar to the second image, the controller performs at least one of changing a driving route of the mobility to the service point, providing a notice of a driving route to be changed to the passenger, or inducing the passenger to select a route by providing the driving route to be changed to the passenger.

8. The apparatus of claim 4, wherein, when the first image is an item image, the controller determines the second image as a preset item image, and determines whether the first image is similar to the second image.

9. The apparatus of claim 8, wherein, upon determining that the first image is similar to the second image, the controller performs at least one of changing a driving route of the mobility to a service point for providing the item, providing a notice of a driving route to be changed to the passenger, inducing the passenger to select a route by providing the driving route to be changed to the passenger, or transmission of an order signal of the item.

10. The apparatus of claim 1, wherein the controller is further configured to determine whether the result of the determination corresponds to an intention of the passenger.

11. A method of generating an image using brain wave signals, the method comprising:
    collecting brain wave signals by a sensor of at least one passenger in a mobility from a plurality of channels for a predetermined time;
    generating a first image of a service point by a controller from the brain wave signals collected from the plurality of channels using an artificial intelligence model;
    determining whether the generated first image is similar to a preset second image; and
    controlling the mobility based on a result of the determination.

12. The method of claim 11, wherein the brain wave signals collected from the plurality of channels are brain wave signals in at least one of a time domain, a frequency domain, or a spatial domain.

13. The method of claim 11, wherein the artificial intelligence model is a generative adversarial network (GAN) model.

14. The method of claim 11, wherein the first image is at least one of a service point image indicating a service point or an item image;
    wherein the service point image is an image indicating a service point and the item image is an image indicating an item provided by the service point; and
    wherein the service point is a drive-through (DT) service provision place within a predetermined range from the mobility.

15. The method of claim 14, wherein the item is at least one of a product provided by the service point, a service provided by the service point or information on the service point.

16. The method of claim 14, wherein, when the first image is a service point image, the determining of whether the first image is similar to the second image comprises determining the second image as a preset service point image, and determining whether the first image is similar to the second image.

17. The method of claim 16, wherein, upon determining that the first image is similar to the second image, the controlling of the mobility comprises performing at least one of changing a driving route of the mobility to the service point, providing a notice of a driving route to be changed to the passenger, or inducing the passenger to select a route by providing the driving route to be changed to the passenger.

18. The method of claim 14, wherein, when the first image is an item image, the determining of whether the first image is similar to the second image comprises determining the second image as a preset item image, and determining whether the first image is similar to the second image.

19. The method of claim 18, wherein, upon determining that the first image is similar to the second image, the controlling of the mobility comprises performing at least one of changing a driving route of the mobility to a service point for providing the item, providing a notice of a driving route to be changed to the passenger, inducing the passenger to select a route by providing the driving route to be changed to the passenger, or transmission of an order signal of the item.

20. The method of claim 11, further comprising determining whether the result of the determination corresponds to an intention of the passenger.

\* \* \* \* \*